United States Patent
Visco et al.

(10) Patent No.: US 12,374,717 B2
(45) Date of Patent: *Jul. 29, 2025

(54) SURFACE TREATMENT OF A SULFIDE GLASS SOLID ELECTROLYTE LAYER

(71) Applicant: PolyPlus Battery Company, Berkeley, CA (US)

(72) Inventors: Steven J. Visco, Berkeley, CA (US); Vitaliy Nimon, Berkeley, CA (US); Alexei Petrov, Berkeley, CA (US); Yevgeniy S. Nimon, Berkeley, CA (US); Bruce D. Katz, Berkeley, CA (US)

(73) Assignee: PolyPlus Battery Company, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/671,779

(22) Filed: May 22, 2024

(65) Prior Publication Data

US 2024/0347764 A1    Oct. 17, 2024

Related U.S. Application Data

(63) Continuation of application No. 17/303,708, filed on Jun. 4, 2021, now Pat. No. 12,021,187.
(Continued)

(51) Int. Cl.
*H01M 10/0562* (2010.01)
*C03C 3/32* (2006.01)
(Continued)

(52) U.S. Cl.
CPC ......... *H01M 10/0562* (2013.01); *C03C 3/321* (2013.01); *C03C 4/14* (2013.01);
(Continued)

(58) Field of Classification Search
None
See application file for complete search history.

(56) References Cited

U.S. PATENT DOCUMENTS

| 3,994,676 A | 11/1976 | Strimple et al. |
| 4,037,043 A | 7/1977 | Segsworth |
(Continued)

FOREIGN PATENT DOCUMENTS

| BR | 112017011548 A2 | 7/2018 |
| BR | 112017011768 A2 | 7/2018 |
(Continued)

OTHER PUBLICATIONS

Akridge, James R. et al., "Solid state batteries using vitreous solid electrolytes," Solid State Ionics 18 & 19 (1986) 1082-1087.
(Continued)

*Primary Examiner* — Roberts P Culbert
(74) *Attorney, Agent, or Firm* — Weaver Austin Villeneuve & Sampson LLP

(57) ABSTRACT

Chemically treating ionically conductive sulfide glass solid electrolyte separators or separator layers can improve performance. In particular, treatment involving chemically etching a surface or surface region of the sulfide glass separator to blunt, lessen or remove edge defects or surface flaws, and/or to enhance surface smoothness is cost effective, reliable and well suited for high production environments compared to physical methods of removing scratches or smoothing surfaces, such as mechanical grinding and polishing.

6 Claims, 1 Drawing Sheet

Related U.S. Application Data

(60) Provisional application No. 63/061,126, filed on Aug. 4, 2020.

(51) Int. Cl.
  *C03C 4/14* (2006.01)
  *C03C 15/02* (2006.01)
  *H01M 10/0525* (2010.01)

(52) U.S. Cl.
  CPC ......... *C03C 15/02* (2013.01); *H01M 10/0525* (2013.01); *C03C 2204/00* (2013.01); *H01M 2300/0068* (2013.01)

(56) References Cited

U.S. PATENT DOCUMENTS

| | | |
|---|---|---|
| 4,042,482 A | 8/1977 | Shannon et al. |
| 4,090,054 A | 5/1978 | Heine et al. |
| 4,121,985 A | 10/1978 | Cherenko |
| 4,208,474 A | 6/1980 | Jacobson et al. |
| 4,331,750 A | 5/1982 | Malugani et al. |
| 4,444,857 A | 4/1984 | Duchange et al. |
| 4,447,393 A | 5/1984 | Weirauch |
| 4,465,745 A | 8/1984 | Akridge |
| 4,465,746 A | 8/1984 | Akridge |
| 4,477,545 A | 10/1984 | Akridge et al. |
| 4,478,920 A | 10/1984 | Gabano et al. |
| 4,513,070 A | 4/1985 | Carette et al. |
| 4,529,027 A | 7/1985 | Brice et al. |
| 4,585,714 A | 4/1986 | Akridge |
| 4,599,284 A | 7/1986 | Akridge |
| 4,601,961 A | 7/1986 | McCartney |
| 4,735,850 A | 4/1988 | Eitman |
| 4,806,439 A | 2/1989 | Wessling et al. |
| 4,863,553 A | 9/1989 | Lehoczky et al. |
| 4,863,798 A | 9/1989 | Arenz et al. |
| 4,985,317 A | 1/1991 | Adachi et al. |
| 5,246,782 A | 9/1993 | Kennedy et al. |
| 5,314,765 A | 5/1994 | Bates |
| 5,338,625 A | 8/1994 | Bates et al. |
| 5,424,147 A | 6/1995 | Khasin et al. |
| 5,455,126 A | 10/1995 | Bates et al. |
| 5,512,147 A | 4/1996 | Bates et al. |
| 5,523,178 A | 6/1996 | Murakami et al. |
| 5,567,210 A | 10/1996 | Bates et al. |
| 5,569,520 A | 10/1996 | Bates |
| 5,582,623 A | 12/1996 | Chu |
| 5,597,660 A | 1/1997 | Bates et al. |
| 5,612,152 A | 3/1997 | Bates |
| 5,648,187 A | 7/1997 | Skotheim |
| 5,686,201 A | 11/1997 | Chu |
| 5,702,995 A | 12/1997 | Fu |
| 5,814,420 A | 9/1998 | Chu |
| 5,824,434 A | 10/1998 | Kawakami et al. |
| 5,958,281 A | 9/1999 | Takada et al. |
| 5,961,672 A | 10/1999 | Skotheim et al. |
| 6,030,909 A | 2/2000 | Fu |
| 6,042,739 A | 3/2000 | Itoh |
| 6,214,061 B1 | 4/2001 | Visco et al. |
| 6,315,881 B1 | 11/2001 | Fu |
| 6,402,795 B1 | 6/2002 | Chu et al. |
| 6,405,565 B1 | 6/2002 | Aitken et al. |
| 6,413,285 B1 | 7/2002 | Chu et al. |
| 6,432,584 B1 | 8/2002 | Visco et al. |
| 6,479,028 B1 | 11/2002 | Kaner et al. |
| 6,485,622 B1 | 11/2002 | Fu |
| 6,723,140 B2 | 4/2004 | Chu et al. |
| 6,733,924 B1 | 5/2004 | Skotheim et al. |
| 6,797,428 B1 | 9/2004 | Skotheim et al. |
| 7,211,532 B2 | 5/2007 | Fu |
| 7,247,408 B2 | 7/2007 | Skotheim et al. |
| 7,273,682 B2 | 9/2007 | Park et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,390,591 B2 | 6/2008 | Visco et al. |
| 7,645,543 B2 | 1/2010 | Visco et al. |
| 7,666,233 B2 | 2/2010 | Visco et al. |
| 7,824,806 B2 | 11/2010 | Visco et al. |
| 7,829,212 B2 | 11/2010 | Visco et al. |
| 7,838,144 B2 | 11/2010 | Visco et al. |
| 7,858,223 B2 | 12/2010 | Visco et al. |
| 8,012,631 B2 | 9/2011 | Seino et al. |
| 8,048,570 B2 | 11/2011 | Visco et al. |
| 8,048,571 B2 | 11/2011 | Visco et al. |
| 8,088,697 B2 | 1/2012 | Yuh et al. |
| 8,092,941 B2 | 1/2012 | Weppner et al. |
| 8,114,171 B2 | 2/2012 | Visco et al. |
| 8,129,052 B2 | 3/2012 | Visco et al. |
| 8,182,943 B2 | 5/2012 | Visco et al. |
| 8,202,649 B2 | 6/2012 | Visco et al. |
| 8,293,398 B2 | 10/2012 | Visco et al. |
| 8,304,019 B1 | 11/2012 | Pichler |
| 8,304,115 B1 | 11/2012 | Petkov et al. |
| 8,323,820 B2 | 12/2012 | Visco et al. |
| 8,334,075 B2 | 12/2012 | Visco et al. |
| 8,389,147 B2 | 3/2013 | Visco et al. |
| 8,404,388 B2 | 3/2013 | Visco et al. |
| 8,445,136 B2 | 5/2013 | Visco et al. |
| 8,455,131 B2 | 6/2013 | Visco et al. |
| 8,501,339 B2 | 8/2013 | Visco et al. |
| 8,556,197 B2 | 10/2013 | Hama et al. |
| 8,652,686 B2 | 2/2014 | Visco et al. |
| 8,658,304 B2 | 2/2014 | Visco et al. |
| 8,658,317 B2 | 2/2014 | Weppner et al. |
| 8,673,477 B2 | 3/2014 | Visco et al. |
| 8,691,444 B2 | 4/2014 | Visco et al. |
| 8,691,928 B2 | 4/2014 | Hsieh et al. |
| 8,778,522 B2 | 7/2014 | Visco et al. |
| 8,778,543 B2 | 7/2014 | Shinohara et al. |
| 8,828,573 B2 | 9/2014 | Visco et al. |
| 8,828,574 B2 | 9/2014 | Visco et al. |
| 8,828,575 B2 | 9/2014 | Visco et al. |
| 8,828,580 B2 | 9/2014 | Visco et al. |
| 8,923,360 B2 | 12/2014 | Coleman et al. |
| 9,077,041 B2 | 7/2015 | Burnside et al. |
| 9,123,941 B2 | 9/2015 | Visco et al. |
| 9,130,198 B2 | 9/2015 | Visco et al. |
| 9,136,568 B2 | 9/2015 | Visco et al. |
| 9,287,573 B2 | 3/2016 | Visco et al. |
| 9,321,652 B2 | 4/2016 | Paquette et al. |
| 9,362,538 B2 | 6/2016 | Visco et al. |
| 9,379,368 B2 | 6/2016 | Roumi |
| 9,598,769 B2 | 3/2017 | Elam et al. |
| 9,601,779 B2 | 3/2017 | Visco et al. |
| 9,660,265 B2 | 5/2017 | Visco et al. |
| 9,905,860 B2 | 2/2018 | Visco et al. |
| 10,147,968 B2 | 12/2018 | Visco et al. |
| 10,164,289 B2 | 12/2018 | Visco et al. |
| 10,601,071 B2 | 3/2020 | Visco et al. |
| 10,629,950 B2 | 4/2020 | Visco et al. |
| 10,707,536 B2 | 7/2020 | Visco et al. |
| 10,804,111 B2 | 10/2020 | Hashimoto et al. |
| 10,833,361 B2 | 11/2020 | Visco et al. |
| 10,840,546 B2 | 11/2020 | Visco et al. |
| 10,840,547 B2 | 11/2020 | Visco et al. |
| 10,862,171 B2 | 12/2020 | Visco et al. |
| 10,868,293 B2 | 12/2020 | Visco et al. |
| 10,916,753 B2 | 2/2021 | Visco et al. |
| 11,171,364 B2 | 11/2021 | Visco et al. |
| 11,174,190 B2 | 11/2021 | Valli et al. |
| 11,239,495 B2 | 2/2022 | Visco et al. |
| 11,444,270 B2 | 9/2022 | Visco et al. |
| 11,631,889 B2 | 4/2023 | Visco et al. |
| 11,646,444 B2 | 5/2023 | Visco et al. |
| 11,646,445 B2 | 5/2023 | Visco et al. |
| 11,749,834 B2 | 9/2023 | Visco et al. |
| 11,817,569 B2 | 11/2023 | Visco et al. |
| 11,876,174 B2 | 1/2024 | Visco et al. |
| 11,984,553 B2 | 5/2024 | Visco et al. |
| 12,021,187 B2 | 6/2024 | Visco et al. |
| 12,021,238 B2 | 6/2024 | Visco et al. |
| 12,034,116 B2 | 7/2024 | Visco et al. |
| 12,051,824 B2 | 7/2024 | Visco et al. |

(56) References Cited

U.S. PATENT DOCUMENTS

| | | |
|---|---|---|
| 12,183,880 B2 | 12/2024 | Visco et al. |
| 12,237,511 B2 | 2/2025 | Visco et al. |
| 2002/0012846 A1 | 1/2002 | Skotheim et al. |
| 2002/0036131 A1 | 3/2002 | Kugai et al. |
| 2002/0182508 A1 | 12/2002 | Nimon et al. |
| 2003/0099884 A1 | 5/2003 | Chiang et al. |
| 2003/0134734 A1 | 7/2003 | Nishimoto et al. |
| 2004/0005504 A1 | 1/2004 | Kugai et al. |
| 2004/0200519 A1 | 10/2004 | Sterzel et al. |
| 2005/0063652 A1 | 3/2005 | Johnson et al. |
| 2005/0107239 A1 | 5/2005 | Akiba et al. |
| 2006/0222954 A1 | 10/2006 | Skotheim et al. |
| 2007/0037058 A1 | 2/2007 | Visco et al. |
| 2007/0059533 A1 | 3/2007 | Burdette et al. |
| 2007/0087269 A1 | 4/2007 | Inda |
| 2007/0119212 A1 | 5/2007 | Huang et al. |
| 2007/0148533 A1 | 6/2007 | Anglin et al. |
| 2007/0160911 A1 | 7/2007 | Senga et al. |
| 2007/0207186 A1 | 9/2007 | Scanlon et al. |
| 2007/0231704 A1 | 10/2007 | Inda |
| 2007/0248888 A1 | 10/2007 | Seino et al. |
| 2007/0271957 A1 | 11/2007 | Nakamura et al. |
| 2007/0281089 A1 | 12/2007 | Heller et al. |
| 2007/0295385 A1 | 12/2007 | Sheats et al. |
| 2008/0057386 A1 | 3/2008 | Visco et al. |
| 2008/0057399 A1 | 3/2008 | Visco et al. |
| 2008/0318132 A1 | 12/2008 | Visco et al. |
| 2009/0100874 A1 | 4/2009 | Tateishi et al. |
| 2009/0117460 A1 | 5/2009 | Isaacson et al. |
| 2009/0142669 A1 | 6/2009 | Shinohara et al. |
| 2009/0159839 A1 | 6/2009 | Seino et al. |
| 2009/0297935 A1 | 12/2009 | Visco et al. |
| 2010/0022378 A1 | 1/2010 | Nguyen et al. |
| 2010/0040952 A1 | 2/2010 | Kimura et al. |
| 2010/0075209 A1 | 3/2010 | Kimura et al. |
| 2010/0135706 A1 | 6/2010 | Miki et al. |
| 2010/0190063 A1 | 7/2010 | Fukumoto et al. |
| 2011/0065007 A1 | 3/2011 | Kamiya et al. |
| 2011/0076570 A1 | 3/2011 | Hama et al. |
| 2011/0108642 A1 | 5/2011 | Hama et al. |
| 2011/0117726 A1 | 5/2011 | Pinnington et al. |
| 2011/0269007 A1 | 11/2011 | Visco et al. |
| 2012/0034529 A1 | 2/2012 | Tatsumisago et al. |
| 2012/0058280 A1 | 3/2012 | Chung et al. |
| 2012/0077020 A1 | 3/2012 | Muramatsu et al. |
| 2012/0094188 A1 | 4/2012 | Visco et al. |
| 2012/0177997 A1 | 7/2012 | Nakamoto et al. |
| 2012/0183834 A1 | 7/2012 | Kanda et al. |
| 2012/0183880 A1 | 7/2012 | Toussaint et al. |
| 2012/0189918 A1 | 7/2012 | Tatsumisago et al. |
| 2012/0204601 A1 | 8/2012 | Murakami |
| 2012/0309157 A1 | 12/2012 | Iwamatsu et al. |
| 2012/0315482 A1 | 12/2012 | Muramatsu et al. |
| 2013/0164631 A1 | 6/2013 | Ohtomo et al. |
| 2013/0164632 A1 | 6/2013 | Kato et al. |
| 2013/0288134 A1 | 10/2013 | Hama et al. |
| 2013/0340827 A1 | 12/2013 | Watzke et al. |
| 2014/0072875 A1 | 3/2014 | Uchiyama |
| 2014/0084224 A1 | 3/2014 | Rittmeyer et al. |
| 2014/0090421 A1 | 4/2014 | Shock et al. |
| 2014/0093785 A1 | 4/2014 | Sugiura et al. |
| 2014/0141341 A1 | 5/2014 | Ohtomo et al. |
| 2014/0151371 A1 | 6/2014 | Chang et al. |
| 2014/0154586 A1 | 6/2014 | Hayashi et al. |
| 2014/0162108 A1 | 6/2014 | Visco et al. |
| 2014/0170465 A1 | 6/2014 | Visco et al. |
| 2014/0186785 A1 | 7/2014 | Mellen |
| 2014/0272524 A1 | 9/2014 | Visco et al. |
| 2014/0322584 A1 | 10/2014 | Visco et al. |
| 2014/0339194 A1 | 11/2014 | Gu et al. |
| 2015/0068251 A1 | 3/2015 | Ottermann et al. |
| 2015/0079481 A1 | 3/2015 | Sun et al. |
| 2015/0107510 A1 | 4/2015 | Lindfors |
| 2015/0138636 A1 | 5/2015 | O'Reilly et al. |
| 2015/0171431 A1 | 6/2015 | Yamada et al. |
| 2015/0214555 A1 | 7/2015 | Visco et al. |
| 2015/0291753 A1 | 10/2015 | Tsukamura et al. |
| 2015/0293347 A1 | 10/2015 | Kreit et al. |
| 2015/0340720 A1 | 11/2015 | Visco et al. |
| 2015/0344342 A1 | 12/2015 | Nguyen et al. |
| 2015/0349371 A1 | 12/2015 | Neudecker et al. |
| 2016/0028053 A1 | 1/2016 | Visco et al. |
| 2016/0028063 A1 | 1/2016 | Visco et al. |
| 2016/0072153 A1 | 3/2016 | Ichikawa et al. |
| 2016/0133989 A1 | 5/2016 | Suzuki et al. |
| 2016/0156065 A1 | 6/2016 | Visco et al. |
| 2016/0190640 A1 | 6/2016 | Visco et al. |
| 2016/0197326 A1 | 7/2016 | Visco et al. |
| 2016/0211547 A1 | 7/2016 | Hwang et al. |
| 2016/0218349 A1 | 7/2016 | Hasegawa et al. |
| 2016/0257593 A1 | 9/2016 | Nguyen et al. |
| 2016/0261002 A1 | 9/2016 | Trevey et al. |
| 2016/0351878 A1 | 12/2016 | Visco et al. |
| 2016/0351879 A1 | 12/2016 | Visco et al. |
| 2017/0117549 A1 | 4/2017 | Hintennach |
| 2017/0229731 A1 | 8/2017 | Visco et al. |
| 2017/0288228 A1 | 10/2017 | Ito et al. |
| 2017/0309899 A1 | 10/2017 | Son et al. |
| 2017/0331156 A1 | 11/2017 | Visco et al. |
| 2017/0355632 A1 | 12/2017 | McEnroe et al. |
| 2017/0365853 A1 | 12/2017 | Visco et al. |
| 2018/0108909 A1 | 4/2018 | Su et al. |
| 2018/0131040 A1 | 5/2018 | Visco et al. |
| 2018/0201540 A1 | 7/2018 | Sheen et al. |
| 2018/0269527 A1 | 9/2018 | Minami |
| 2018/0309157 A1 | 10/2018 | Visco et al. |
| 2018/0337413 A1 | 11/2018 | Sassen et al. |
| 2019/0013546 A1 | 1/2019 | Visco et al. |
| 2019/0148768 A1 | 5/2019 | Visco et al. |
| 2019/0173128 A1 | 6/2019 | Visco et al. |
| 2019/0177878 A1 | 6/2019 | Kanatzidis et al. |
| 2019/0181496 A1 | 6/2019 | Visco et al. |
| 2019/0194052 A1 | 6/2019 | Nguyen et al. |
| 2019/0229370 A1 | 7/2019 | Visco et al. |
| 2019/0237801 A1 | 8/2019 | Kanno et al. |
| 2019/0237810 A1 | 8/2019 | Visco et al. |
| 2019/0241455 A1 | 8/2019 | Sweney et al. |
| 2019/0276356 A1 | 9/2019 | Abbott et al. |
| 2019/0305370 A1 | 10/2019 | Minamida |
| 2019/0321921 A1 | 10/2019 | Paris et al. |
| 2020/0014063 A1 | 1/2020 | Visco et al. |
| 2020/0028209 A1 | 1/2020 | Visco et al. |
| 2020/0123038 A1 | 4/2020 | Jud et al. |
| 2020/0127275 A1 | 4/2020 | Visco et al. |
| 2020/0243902 A1 | 7/2020 | Visco et al. |
| 2020/0251773 A1 | 8/2020 | Visco et al. |
| 2020/0395633 A1 | 12/2020 | Visco et al. |
| 2021/0098818 A1 | 4/2021 | Visco et al. |
| 2021/0098819 A1 | 4/2021 | Visco et al. |
| 2021/0111427 A1 | 4/2021 | Visco et al. |
| 2021/0126236 A1 | 4/2021 | Visco et al. |
| 2021/0218005 A1 | 7/2021 | Matzner et al. |
| 2021/0218055 A1 | 7/2021 | Visco et al. |
| 2021/0320328 A1 | 10/2021 | Visco et al. |
| 2021/0340048 A1 | 11/2021 | Visco et al. |
| 2021/0380456 A1 | 12/2021 | Visco et al. |
| 2021/0395128 A1 | 12/2021 | Visco et al. |
| 2022/0013857 A1 | 1/2022 | Visco et al. |
| 2022/0045328 A1 | 2/2022 | Visco et al. |
| 2022/0045352 A1 | 2/2022 | Visco et al. |
| 2022/0045353 A1 | 2/2022 | Visco et al. |
| 2022/0216509 A1 | 7/2022 | Sasaki et al. |
| 2022/0263137 A1 | 8/2022 | Visco et al. |
| 2022/0302492 A1 | 9/2022 | Visco et al. |
| 2022/0320573 A1 | 10/2022 | Visco et al. |
| 2022/0320579 A1 | 10/2022 | Visco et al. |
| 2022/0328865 A1 | 10/2022 | Visco et al. |
| 2022/0328866 A1 | 10/2022 | Visco et al. |
| 2022/0336849 A1 | 10/2022 | Visco et al. |
| 2022/0396516 A1 | 12/2022 | Visco et al. |
| 2022/0399567 A1 | 12/2022 | Visco et al. |
| 2023/0091921 A1 | 3/2023 | Visco et al. |
| 2023/0098257 A1 | 3/2023 | Visco et al. |
| 2023/0299336 A1 | 9/2023 | Visco et al. |

(56) References Cited

U.S. PATENT DOCUMENTS

| | | |
|---|---|---|
| 2023/0335786 A1 | 10/2023 | Visco et al. |
| 2023/0335789 A1 | 10/2023 | Visco et al. |
| 2023/0420634 A1 | 12/2023 | Visco et al. |
| 2024/0088359 A1 | 3/2024 | Visco et al. |
| 2024/0088433 A1 | 3/2024 | Visco et al. |
| 2024/0092676 A1 | 3/2024 | Visco et al. |
| 2024/0283011 A1 | 8/2024 | Visco et al. |
| 2024/0347731 A1 | 10/2024 | Visco et al. |
| 2024/0347763 A1 | 10/2024 | Visco et al. |
| 2024/0363895 A1 | 10/2024 | Visco et al. |
| 2024/0405263 A1 | 12/2024 | Visco et al. |
| 2024/0429404 A1 | 12/2024 | Visco et al. |
| 2025/0006984 A1 | 1/2025 | Visco et al. |

FOREIGN PATENT DOCUMENTS

| | | | |
|---|---|---|---|
| CN | 101346424 | A | 1/2009 |
| CN | 101494299 | A | 7/2009 |
| CN | 101535039 | A | 9/2009 |
| EP | 0774654 | B1 | 1/2000 |
| EP | 3227952 | A1 | 10/2017 |
| JP | 2004063419 | A | 2/2004 |
| JP | 2004127743 | A | 4/2004 |
| JP | 2007311084 | A | 11/2007 |
| JP | 2008103229 | A | 5/2008 |
| JP | 2008103258 | A | 5/2008 |
| JP | 2008300300 | A | 12/2008 |
| JP | 2009158476 | A | 7/2009 |
| JP | 2009252670 | A | 10/2009 |
| JP | 2010108881 | A | 5/2010 |
| JP | 2010123463 | A | 6/2010 |
| JP | 2012043654 | A | 3/2012 |
| JP | 2012089244 | A | 5/2012 |
| JP | 2012089424 | A | 5/2012 |
| JP | 2012096973 | A | 5/2012 |
| JP | 2013117398 | A | 6/2013 |
| JP | 2013232335 | A | 11/2013 |
| JP | 2014035989 | A | 2/2014 |
| JP | 2014096311 | A | 5/2014 |
| JP | 2014127272 | A | 7/2014 |
| JP | 2014221714 | A | 11/2014 |
| KR | 20140011258 | A | 1/2014 |
| WO | WO-9801401 | A1 | 1/1998 |
| WO | WO-2009003695 | A2 | 1/2009 |
| WO | WO-2009094524 | A1 | 7/2009 |
| WO | WO-2012017544 | A1 | 2/2012 |
| WO | WO-2013141481 | A1 | 9/2013 |
| WO | WO-2016089897 | A1 | 6/2016 |
| WO | WO-2016089899 | A1 | 6/2016 |
| WO | WO-2017112550 | A1 | 6/2017 |
| WO | WO-2017197039 | A1 | 11/2017 |
| WO | WO-2018141919 | A1 | 8/2018 |
| WO | WO-2019010047 | A1 | 1/2019 |
| WO | WO-2019018386 | A1 | 1/2019 |
| WO | WO-2019121340 | A1 | 6/2019 |
| WO | WO-2019204244 | A1 | 10/2019 |

OTHER PUBLICATIONS

Bartholomew, Roger F. et al., "Electrical properties of new glasses based on the Li2S—SiS2 system," Journal of Non-Crystalline Solids 256&257 (1999) 242-247.

Bates, J.B. et al., "Electrical properties of amorphous lithium electrolyte thin films," 1992, Solid State Ionics.

Bates, J.B. et al., "Thin-film rechargeable lithium batteries," 1995, Journal of Power Sources.

Bertschler, Eva-Maria et al., "Li+ Ion Conductors with Adamantane-Type Nitridophosphate Anions β-Li10P4N10 and Li13P4N10X3 with X=Cl, Br", Chemistry: A European Journal, vol. 24, Issue 1, (Jan. 2, 2018), pp. 196-205.

BR Office Action dated Aug. 3, 2022, in Application No. BR112017011768-1 awaiting English translation.

BR Office Action dated Aug. 3, 2022, in Application No. BR112017011768-1.

BR Office Action dated Mar. 28, 2022 in Application No. BR20171111548 with English translation.

BR Office Action dated Mar. 28, 2022 in Application No. BR20171111768 with English translation.

Burckhardt, W. et al., "Fast Li+ ion transport in iodine-thioborate glasses," Mat. Res. Bull., vol. 19, pp. 1083-1089, 1984.

CA Office Action dated May 31, 2022, in Application No. CA2969113.

CA Office Action dated Oct. 7, 2021, in application No. CA2,969,117.

Cao, C. et al., "Recent advances in inorganic solid electrolytes for lithium batteries," Frontiers in Energy Research, Jun. 27, 2014, vol. 2, No. 25, pp. 1-10.

CN Office Action dated Feb. 3, 2019, CN Application No. 201580075233.0 with English Translation.

Communication Pursuant to Article 94(3) EPC, First Office Action, dated May 13, 2019, for European Patent Application No. 15864779.2.

Communication Pursuant to Rules 161(2) and 162 EPC, (request for extra claims fees), dated Aug. 4, 2017, for European Patent Application No. 15864779.2.

Communication Pursuant to Rules 70(2) and 70a(2), dated Jun. 8, 2018, deadline for response to Extended European Search Report, for European Patent Application No. 15864779.2.

Decision for Grant, dated Sep. 29, 2020, for Japanese Patent Application No. 2017-529785, with translation.

EP Search Report dated Dec. 22, 2021, in Application No. EP21183687.9.

Examination Report, dated Sep. 14, 2020, for European Patent Application No. 15864779.2, 3 Pages.

Extended European Search Report, dated May 22, 2018, for European Patent Application No. 15864779.2.

Final Office Action for U.S. Appl. No. 15/726,302, dated Dec. 30, 2020.

Final Office Action for U.S. Appl. No. 15/929,959, dated Apr. 29, 2021.

First Office Action, dated Dec. 15, 2020, for Canadian Patent Application No. 2,969,113.

First Office Action, dated Jan. 14, 2020, for Brazilian Patent Application No. BR112017011548-4, with English Translation.

First Office Action, dated Jan. 14, 2020, for Brazilian Patent Application No. BR112017011768-1, with English Translation.

First Office Action, dated May 10, 2021, for Canadian Patent Application No. 2,969, 117.

Flexible Graphite Foil as viewed at https://hpmsgraphite.com/graphitefoil using the Wayback machine (Year: 2004).

Flexible Graphite Foil as viewed at https://hpmsgraphite.com/graphitefoil via the Wayback archive (Year: 2018).

Fu, Jie, "Fast Li+ ion conducting glass-ceramics in the system Li2O—Al2O3—GeO2—P2O5" Solid State Ionics 104 (1997), pp. 191-194.

Fu, Jie, "Fast Li+ Ion Conduction in Li2O—Al2O3—TiO2—SiO2—P2O5 Glass-Ceramics," Journal of the American Ceramics Society, vol. 80, No. 7, Jul. 1997, pp. 1-5.

Fu, Jie, "Superionic conductivity of glass-ceramics in the system Li2O—Al2O3—TiO3—P2O5", Solid State Ionics 96 (1997), pp. 195-200.

Geiss, M. "Sacrificial Interlayers for All-solid-state Batteries", Aug. 14, 2020, pp. 243.

George, S.M., "Atomic layer deposition: an overview", Chemical reviews, (Jan. 13, 2010), 110(1):111-31.

Hayashi, A. et al., "Preparation of $Li_2S$—$P_2S_5$ Amorphous Solid Electrolytes by Mechanical Milling," Journal of American Ceramic Society, Feb. 28, 2001, vol. 84, No. 2, pp. 477-479.

Hayashi, Akitoshi et al., "Characterization of Li2S—P2S5 glass-ceramics as a solid electrolyte for lithium secondary batteries," Solid State Ionics 175 (2004) 683-686.

Hayashi, Akitoshi et al., "Formation of superionic crystals from mechanically milled Li2S—P2S5 glasses," Electrochemistry Communications 5 (2003) 111-114, Nov. 26, 2002.

Hayashi, Akitoshi et al., "Mechanochemical synthesis of amorphous solid electrolytes using SiS2 and various lithium compounds," Solid State Ionics 175 (2004) 637-640, Dec. 9, 2003.

(56) References Cited

OTHER PUBLICATIONS

Hayashi, Akitoshi et al., "Preparation and ionic conductivity of Li7P3S11-z glass-ceramic electrolytes," Journal of Non-Crystalline Solids 356 (2010) 2670-2673.
Hirota, Yukihiro and Osamu Mikami, "Energy Barrier Height Measurements of Chemically Vapour Deposited, P3N5 Films by Internal Photoinjection", Thin Solid Films, vol. 162, (Aug. 1988), pp. 41-47.
Hoffman, E. E., "Solubility of Nitrogen and Oxygen in Lithium and Methods of Lithium Purification," in Symposium on Newer Metals, ed. R. Jaffee (West Conshohocken, PA: ASTM International, 1960), 195-206. https://doi.org/10.1520/STP46339S.
HPMS HP Materials Solutions Inc., "Flexible Graphite Foil", The Wayback Machine, 2021, pp. 1-7.
Johnson, R.W., Hultqvist, A., Bent, S.F., "A brief review of atomic layer deposition: from fundamentals to applications", Materials today, (Jun. 1, 2014), 17(5):236-46.
Jones, Steven D. et al., "A thin-film solid-state microbattery," Journal of Power Sources, 43-44 (1993) 505-513.
JP Notice of Reasons for Rejection dated Oct. 5, 2021, in application No. JP20200181662 with English translation.
JP Office Action dated Jan. 4, 2023, in Application No. JP2020-181662 with English translation.
JP Office Action dated May 31, 2022, in Application No. JP2020-181662 with English translation.
Kanno, R. and M. Murayama, "Lithium ionic conductor thio-LISICON: the Li2 S GeS2 P 2 S 5 system", Journal of the electrochemical society, (Jun. 5, 2001), 148(7):A742.
Kato, A. et al ., "High-Temperature Performance of All-Solid-State Lithium-Metal Batteries Having Li/Li$_3$PS$_4$ Interfaces Modified with Au Thin Films", Journal of The Electrochemical Society, 2018, vol. 165, No. 9, pp. A1950-A1954.
Kennedy, J.H., "Ionically conductive glasses based on SiS2," Materials Chemistry and Physics, 23 (1989) 29-50.
Kennedy, John H. et al., "Improved stability for the SiS2—P2S5—Li2S-LiI glass system," Solid State Ionics 28-30 (1998) 726-728.
Kennedy, John H. et al., "Ionically conductive sulfide-based lithium glasses," Journal of Non-Crystalline Solids 123 (1990) 328-338.
Kennedy, John H. et al., "Preparation and conductivity measurements of SiS2—Li2S glasses doped with LiBr and LiCl," Solid State Ionics 18 & 19 (1986) 368-371.
Kitaura, Hirokazu et al., "Fabrication of electrode-electrolyte interfaces in all-solid-state rechargeable lithium batteries by using a supercooled liquid state of the glassy electrolytes," J. Mater. Chem., 2011, 21, 118.
Kondo, S. et al., "New lithium ion conductors based on Li2S—SiS2 system," Solid State Ionics 53-56 (1992) 1183-1186.
KR Office Action dated Jun. 23, 2022 in Application No. KR10-2017-7018176 with English translation.
KR Office Action dated Nov. 23, 2023, in KR Application No. 10-2023-7010384 with English translation.
Lau, J., et al., "Sulfide Solid Electrolytes for Lithium Battery Applications," Advanced Energy Materials, 2018, vol. 8, pp. 1-24.
Levason, Bill and Andrew L. Hector (eds.), "Chemistry and Applications of Metal Nitrides," (Preface only), Coordinated Chemistry Reviews, vol. 257, Issues 13-14, (Jul. 2013), p. 1945.
Li, Xuemin et al., "Facile Synthesis of Lithium Sulfide Nanocrystals for Use in Advanced Rechargeable Batteries", ACS Appl. Mater. Interfaces, (Dec. 3, 2015), 7, 51, 28444-28451.
Maier-Komor, P., "Preparation of Phosphorus Targets Using the Compound Phosphorus Nitride", Nuclear Instruments and Methods in Physics Research Section A: Accelerators, Spectrometers, Detectors and Associated Equipment, vol. 257, Issue 1, (Jun. 1, 1987), pp. 1-3.
Malugani, J.P. et al., "Preparation and electrical properties of the 0,37 Li2S-0,18P2S5-0,45 LiI glass," Solid State Ionics 1 (1980) 519-523.
Mercier, René et al., "Superionic conduction in Li2S—P2S5-LiI—glasses," Solid State Ionics. (Oct. 1981) 5:663-666.

Mexican Office Action dated Oct. 20, 2022 issued in Application No. MX/a/2017/007265 with English translation.
Minami, Keiichi et al., "Electical and electrochemical properties of glass-ceramic electrolytes in the systems Li2S—P2S5—P2S3 and Li2S—P2S5—P2O5," Solid State Ionics 192 (2011) 122-125.
Minami, Keiichi et al., "Mechanochemical synthesis of Li2S—P2S5 glass electrolytes with lithium salts," Solid State Ionics 181 (2010) 1505-1509.
Minami, Keiichi et al., "Preparation and characterization of lithium ion conducting Li2S—P2S5—GeS2 glasses and glass-ceramics," Journal of Non-Crystalline Solids 356 (2010) 2666-2669.
Minami, Tsutomu et al., "Preparation and characterization of lithium ion-conducting oxysulfide glasses," Solid State Ionics 136-137 (2000) 1015-1023.
Mizuno, F., et al. "High lithium ion conducting glass-ceramics in the system Li2S—P2S5", Solid State Ionics, (Oct. 31, 2006), 177(26-32):2721-5.
Mizuno, Fuminori et al., "All Solid-state Lithium Secondary Batteries Using High Lithium Ion Conducting Li2S—P2S5 Glass-Ceramics", Chemistry Letters 2002, No. 12, The Chemical Society of Japan, (Dec. 5, 2002), 31(12):1244-1245 (with 2 cover pages).
Mizuno, Fuminori et al., "Lithium ion conducting solid electrolytes prepared from Li2S, elemental P and S," Solid State Ionics 177 (2006) 2753-2757.
Mizuno, Fuminori et al., "New, highly Ion-Conductive Crystals Precipitated from Li2S—P2S5 Glasses", Advanced Materials, (Apr. 4, 2005), 17(7):918-21.
Murayama, M., et al., "Material design of new lithium ionic conductor, thio-LISICON, in the Li2S—P2S5 system", Solid State Ionics, (May 31, 2004), 170(3-4):173-80.
Non-Final Office Action for U.S. Appl. No. 14/954,812, dated Aug. 1, 2018.
Non-Final Office Action for U.S. Appl. No. 14/954,816, dated Aug. 1, 2018.
Non-final Office Action for U.S. Appl. No. 15/726,302, dated Apr. 16, 2020.
Non-final Office Action for U.S. Appl. No. 15/726,302, dated Sep. 10, 2021.
Non-final Office Action for U.S. Appl. No. 16/161,720, dated Apr. 28, 2020.
Non-Final Office Action for U.S. Appl. No. 16/174,058, dated Sep. 17, 2021.
Non-final Office Action for U.S. Appl. No. 16/179,803, dated Apr. 28, 2020.
Non-final Office Actions for U.S. Appl. No. 15/380,989, dated Mar. 26, 2019.
Notice of Allowance, dated Mar. 10, 2020, for Chinese Patent Application No. 201580075233.0, with English Translation.
Notice of Allowance dated Oct. 1, 2021, in U.S. Appl. No. 16/781,713.
Notice of Allowance for U.S. Appl. No. 14/954,812, dated Oct. 30, 2018.
Notice of Allowance for U.S. Appl. No. 14/954,816, dated Oct. 15, 2018.
Notice of Allowance for U.S. Appl. No. 15/380,989, dated Dec. 6, 2019.
Notice of Allowance for U.S. Appl. No. 16/012,588, dated Dec. 3, 2019.
Notice of Allowance for U.S. Appl. No. 16/161,720, dated Aug. 6, 2020.
Notice of Allowance for U.S. Appl. No. 16/179,803, dated Aug. 11, 2020.
Notice of Allowance for U.S. Appl. No. 16/341,872, dated Aug. 21, 2020.
Notice of Allowance for U.S. Appl. No. 16/341,874, dated Sep. 3, 2020.
Notice of Allowance for U.S. Appl. No. 16/663,177, dated Sep. 3, 2020.
Notice of Allowance for U.S. Appl. No. 15/929,959, dated Aug. 4, 2021.
Notice of Allowance for U.S. Appl. No. 15/929,959, dated Jul. 12, 2021.
Notice of Intention to Grant, dated Jan. 26, 2021, for European Patent Application No. 15864779.2, 7 Pages.

(56) References Cited

OTHER PUBLICATIONS

Notice of Reasons for Rejection, dated Jan. 14, 2020, for Japanese Patent Application No. 2017-529785, with machine translation.
Notice of Reasons for Rejection, dated May 24, 2019, for Japanese Patent Application No. 2017-529785, with machine translation.
Ohtomo, Takamasa et al., "All-solid-state lithium secondary batteries using the 75Li2S•25P2S5glass and the 70Li2S•30P2S5 glass-ceramic as solid electrolytes," Journal of Power Sources 233 (2013) 231-235.
Ohtomo, Takamasa et al., "Electrical and electrochemical properties of Li2S—P2S5—P2—O5 glass-ceramic electrolytes," Journal of Power Sources 146 (2005) 715-718.
Ohtomo, Takamasa et al., "Mechanochemical synthesis of lithium ion conducting glasses and glass-ceramics in the system Li2S—P—S," Solid State Ionics 176 (2005) 2349-2353.
Panasonic Industry "PGS" Graphite Sheets as viewed at 2021.
Park., 2013.—(machine translation), 13 pages.
Pradel, A., et al., "Lithium Chalcogenide Conductive glasses," Materials Chemistry and Physics, 1989, vol. 23, pp. 121-142.
Pradel, Annie et al., "Electrical properties of lithium conductive silicon sulfide glasses prepared by twin roller quenching," Solid State Ionics 18 & 19 (1986) 351-355.
Restriction Requirement for U.S. Appl. No. 15/380,989, dated Jul. 5, 2018.
Restriction Requirement for U.S. Appl. No. 15/726,302, dated May 6, 2019.
Restriction Requirement for U.S. Appl. No. 15/726,302, dated Nov. 19, 2019.
Restriction Requirement for U.S. Appl. No. 16/174,058, dated Apr. 16, 2020.
Rudolph, B. et al., "Cyclic voltammetry studies of the lithiumthioborate glass-indium interface," Electrochimica Acta, vol. 34, No. 11, pp. 1519-1521, 1989.
Sahami, Saeed et al., "Preparation and conductivity measurements of SiS2—Li2S—LiBr lithium ion conductive glasses," Journal of the Electrochemical Society, Apr. 1985, pp. 985-986.
Sakuda, Atsushi et al., "Sulfide solid electrolyte with favorable mechanical property for all-solid-state lithium battery," Scientific Reports 3:2261, Jul. 23, 2013.
Sandfire Scientific., "Quartz Ampoules Coated with Layer of Pyrolyzed Carbon," 2015, pp. 1-2. https://sandfire.com/quartz-ampoules-coated-with-layer-of-pyrolyzed-carbon/.
Second Office Action, dated Nov. 15, 2019, for Chinese Patent Application No. 201580075233.0, with English Translation.
Senevirathne, K. et al., "A New Crystalline LiPON Electrolyte: Synthesis, Properties, and Electronic Structure", Solid State Ionics, Feb. 21, 2013, vol. 233, pp. 95-101.
Svensson PH, Kloo L. Synthesis, structure, and bonding in polyiodide and metal iodide-iodine systems. Chemical Reviews. (Mar. 22, 2003), 103(5):1649-84.
Tatsumisago, M., et al., "Superionic conduction in rapidly quenched Li2S—SiS2—Li3PO4 glasses", Journal of the Ceramic Society of Japan, (Nov. 1, 1993), 101(1179):1315-7.
Tatsumisago, Masahiro et al., "Preparation and structure of lithium-ion-conducting mixed-anion glasses in the system LiBO2—LiBS2," J. Am. Ceram. Soc., 71 [9] 766-69 (1988).
Tatsumisago, Masahiro et al., "Recent development of sulfide solid electrolytes and interfacial modification for all-solid-state rechargeable lithium batteries," Journal of Asian Ceramic Societies 1 (2013) 17-25.
Tatsumisago, Masahiro, "Glassy materials based on Li2S for all-solid-state lithium secondary batteries," Solid State Ionics 175 (2004) 13-18.
Thangadurai, V. et al., "Novel fast lithium ion conduction in garnet-type $Li_5La_3M_2O_{12}$ (M=Nb, Ta)", Journal of the American Ceramic Society, Mar. 2003, vol. 86, No. 3, pp. 437-440.
Trevey, James et al., "Glass-ceramic Li2S—P2S5 electrolytes prepared by a single step ball billing process and their appliction for all-solid-state lithium-ion batteries," Electrochemistry Communications 11 (2009) 1830-1833.

U.S. Restriction Requirement dated Aug. 31, 2022 in U.S. Appl. No. 16/949,026.
U.S. Corrected Notice of Allowance dated Jun. 13, 2022, in U.S. Appl. No. 16/948,863.
U.S. Corrected Notice of Allowance dated May 16, 2024 in U.S. Appl. No. 17/303,707.
U.S. Corrected Notice of Allowance dated Sep. 20, 2023, in U.S. Appl. No. 18/175,374.
U.S. Final Office Action dated Jan. 16, 2024 in U.S. Appl. No. 17/243,429.
U.S. Final Office Action dated Mar. 6, 2023 in U.S. Appl. No. 16/948,835.
U.S. Final office Action dated Oct. 6, 2023 in U.S. Appl. No. 16/556,736.
U.S. Final Office Action dated Oct. 27, 2023 in U.S. Appl. No. 16/949,026.
U.S. Non Final Office Action dated Feb. 2, 2023 in U.S. Appl. No. 16/949,026.
U.S. Non Final Office Action dated Mar. 31, 2023 for U.S. Appl. No. 16/556,736.
U.S. Non-Final office Action dated Oct. 27, 2022 in U.S. Appl. No. 16/948,835.
U.S. Non-Final Office Action dated Apr. 11, 2023 in U.S. Appl. No. 17/303,707.
U.S. Non-Final Office Action dated Aug. 18, 2023, in U.S. Appl. No. 17/303,706.
U.S. Non-Final Office Action dated Dec. 4, 2023 in U.S. Appl. No. 17/302,027.
U.S. Non-Final Office Action dated Dec. 7, 2023 in U.S. Appl. No. 17/303,708.
U.S. Non-Final Office Action dated Dec. 23, 2022 in U.S. Appl. No. 16/784,162.
U.S. Non-Final Office Action dated Jan. 5, 2024 in U.S. Appl. No. 17/453,033.
U.S. Non-Final Office Action dated Jun. 7, 2023, in U.S. Appl. No. 17/243,429.
U.S. Non-Final Office Action dated Mar. 14, 2024 in U.S. Appl. No. 17/301,453.
U.S. Non-Final Office Action dated Nov. 18, 2022, in U.S. Appl. No. 16/948,836.
U.S. Notice of Allowance dated May 12, 2022, in U.S. Appl. No. 16/948,863.
U.S. Notice of Allowance dated Apr. 15, 2024 in U.S. Appl. No. 17/303,706.
U.S. Notice of allowance dated Dec. 9, 2022, in U.S. Appl. No. 17/248,225.
U.S. Notice of Allowance dated Feb. 15, 2024 in U.S. Appl. No. 16/721,787.
U.S. Notice of Allowance dated Jan. 9, 2023, in U.S. Appl. No. 16/948,836.
U.S. Notice of Allowance dated Jan. 19, 2023, in U.S. Appl. No. 16/948,836.
U.S. Notice of Allowance dated Jan. 30, 2024 in U.S. Appl. No. 16/721,787.
U.S. Notice of Allowance dated Jun. 6, 2024 in U.S. Appl. No. 17/303,706.
U.S. Notice of Allowance dated Jun. 20, 2023 in U.S. Appl. No. 16/509,385.
U.S. Notice of Allowance dated Mar. 15, 2023 in U.S. Appl. No. 16/948,835.
U.S. Notice of Allowance dated Mar. 20, 2023 in U.S. Appl. No. 17/817,494.
U.S. Notice of Allowance dated Mar. 27, 2024 in U.S. Appl. No. 17/302,491.
U.S. Notice of Allowance dated May 8, 2024 in U.S. Appl. No. 17/303,707.
U.S. Notice of Allowance dated May 8, 2024 in U.S. Appl. No. 17/303,708.
US Notice of Allowance dated Oct. 20, 2021, in U.S. Appl. No. 16/781,713.
U.S. Notice of Allowance dated Sep. 12, 2023 in U.S. Appl. No. 18/175,374.
U.S. Appl. No. 16/948,864, inventors Visco et al., filed Oct. 2, 2020.

(56) References Cited

OTHER PUBLICATIONS

U.S. Appl. No. 17/934,470, inventors Visco et al., filed Sep. 22, 2022.
U.S. Appl. No. 18/048,400, inventors Visco et al., filed Oct. 20, 2022.
U.S. Appl. No. 18/149,524, inventors Visco et al., filed Jan. 3, 2023.
U.S. Appl. No. 18/175,374, inventors Visco et al., filed Feb. 27, 2023.
U.S. Appl. No. 18/529,777, inventors Visco S J, et al., filed Dec. 5, 2023.
U.S. Appl. No. 18/590,753, inventor Visco S, filed Feb. 28, 2024.
U.S. Appl. No. 18/645,270, inventors Visco S.J, et al., filed Apr. 24, 2024.
U.S. Appl. No. 18/671,767, inventor Visco S, filed May 22, 2024.
U.S. Appl. No. 18/671,772, inventor Visco S, filed May 22, 2024.
U.S. Restriction requirement dated Apr. 3, 2023 in U.S. Appl. No. 17/303,706.
U.S. Restriction Requirement dated Dec. 23, 2022 in U.S. Appl. No. 16/556,736.
U.S. Restriction Requirement dated Jan. 18, 2023 in U.S. Appl. No. 17/303,707.
U.S. Restriction requirement dated May 18, 2023, in U.S. Appl. No. 16/721,787.
U.S. Restriction Requirement dated Nov. 3, 2022 in U.S. Appl. No. 16/509,385.
Visco, Steven J. et al., "Complex plane and 7Li NMR studies of arsenic sulfide-based lithium glasses," J. Electrochem. Soc.: Solid-State Science and Technology, Jul. 1985, pp. 1766-1770.
Visco, Steven J. et al., "Complex plane and 7Li NMR studies of highly conductive sulfide-based lithium glasses," Battery Testing, vol. 132, No. 4, pp. 751-753.
Wada, H., et al., "Preparation and ionic conductivity of new B2S3—Li2S-LiI glasses", Materials research bulletin, (Feb. 1, 1983), 18(2):189-93.
Wenzel, Sebastian et al., "Interphase formation and degradation of charge transfer kinetics between a lithium metal anode and highly crystalline Li7P3S11 solid electrolyte", Solid State Ionics, (Mar. 1, 2016), 286:24-33.
Wikipedia., "Sintering", The Free Encyclopedia, 2023, pp. 1-15.
WO patent application No. PCT/US2015/063231, International Search Report and Written Opinion mailed Mar. 11, 2016.
WO patent application No. PCT/US2015/063234, International Search Report and Written Opinion mailed Apr. 1, 2016.
WO patent application No. PCT/US2016/067338, International Preliminary Report on Patentability, dated mailed Jul. 5, 2018.
WO patent application No. PCT/US2016/067338, International Search Report and Written Opinion mailed May 19, 2017.
WO patent application No. PCT/US2018/039862, International Search Report and Written Opinion mailed Oct. 19, 2018.
WO patent application No. PCT/US2018/039862, Invitation to Pay Additional Fees and, where applicable, Protest Fee, dated Aug. 28, 2018.
WO patent application No. PCT/US2018/042476, Invitation to Pay Additional Fees and, where applicable, Protest Fee, dated Sep. 12, 2018.
Yang, M. et al., "Membranes in lithium ion batteries," Membranes, Jul. 4, 2012, vol. 2, pp. 367-383.
Annika B., et al., "Lithium-Ion Conducting Thin-Films for Solid-State Batteries prepared by Chemical Solution Deposition," Justus-Liebig-Universitat Gieen, 2018, 190 Pages.
Ko, Y., et al., "Influence of Process Conditions on Structural and Electrochemical Properties of Lithium Phosphorus Oxynitride Thin Films," Ceramics International, 2020, vol. 46, pp. 20623-20632.
Lopez-Aranguren, P., et al., "Crystalline Li PON as a Bulk-Type Solid Electrolyte," ACS Energy Letters, 2021, vol. 6 (2), pp. 445-450.
Mascaraque, N., et al., "Structure and Electrical Properties of a New Thin-phosphorus Oxynitride Glass Electrolyte," Journal of Non-Crystalline Solids, 2014, vol. 405, pp. 159-162.
Trim-Lok, "Plastic Trims & Edge Guards," Trim-Lok, Inc., Jan. 2015, pp. 1-5.
U.S. Corrected Notice of Allowance dated Apr. 1, 2025 in U.S. Appl. No. 17/654,648.
U.S. Corrected Notice of Allowance dated Jun. 26, 2024 in U.S. Appl. No. 17/302,491.
U.S. Corrected Notice of Allowance dated Mar. 17, 2025 in U.S. Appl. No. 17/249,864.
U.S. Corrected Notice of Allowance dated Oct. 28, 2024 in U.S. Appl. No. 18/191,615.
U.S. Final Office Action dated Jul. 29, 2024 in U.S. Appl. No. 17/453,033.
U.S. Non-Final Office Action dated Aug. 19, 2024 in U.S. Appl. No. 17/658,646.
U.S. Non-Final Office Action dated Dec. 6, 2024 in U.S. Appl. No. 18/671,772.
U.S. Non-Final Office Action dated Dec. 18, 2024 in U.S. Appl. No. 17/650,770.
U.S. Non-Final Office Action dated Dec. 27, 2024 in U.S. Appl. No. 17/658,645.
U.S. Non-Final Office Action dated Jan. 10, 2025 in U.S. Appl. No. 17/648,120.
U.S. Non-Final Office Action dated Mar. 13, 2025 in U.S. Appl. No. 18/671,767.
U.S. Non-Final Office Action dated Mar. 14, 2025 in U.S. Appl. No. 18/048,400.
U.S. Non-Final Office Action dated Mar. 18, 2025 in U.S. Appl. No. 17/654,233.
U.S. Non-Final Office Action dated Mar. 18, 2025 in U.S. Appl. No. 17/813,463.
U.S. Non-Final Office Action dated Nov. 14, 2024 in U.S. Appl. No. 17/658,639.
U.S. Non-Final Office Action dated Oct. 23, 2024 in U.S. Appl. No. 18/333,282.
U.S. Non-Final Office Action dated Oct. 31, 2024 in U.S. Appl. No. 17/649,550.
U.S. Notice of Allowance dated Jan. 15, 2025 in U.S. Appl. No. 18/671,772.
U.S. Notice of Allowance dated Mar. 11, 2025 in U.S. Appl. No. 17/249,864.
U.S. Notice of Allowance dated Mar. 12, 2025 in U.S. Appl. No. 17/654,648.
U.S. Notice of Allowance dated Oct. 17, 2024 in U.S. Appl. No. 18/191,615.
U.S. Appl. No. 18/953,017, inventors Visco S.J et al., filed Nov. 19, 2024.
U.S. Appl. No. 19/024,530, inventors Visco S.J et al., filed Jan. 16, 2025.
U.S. Restriction Requirement dated Feb. 6, 2025 in U.S. Appl. No. 17/813,463.
U.S. Restriction Requirement dated Feb. 6, 2025 in U.S. Appl. No. 18/048,400.
U.S. Restriction requirement dated Nov. 18, 2024 in U.S. Appl. No. 17/648,120.
U.S. Restriction requirement dated Oct. 1, 2024 in U.S. Appl. No. 17/650,770.
U.S. Restriction requirement dated Oct. 24, 2024 in U.S. Appl. No. 17/249,864.
U.S. Restriction requirement dated Sep. 5, 2024 in U.S. Appl. No. 17/658,645.
U.S. Restriction requirement dated Sep. 29, 2024 in U.S. Appl. No. 17/934,470.

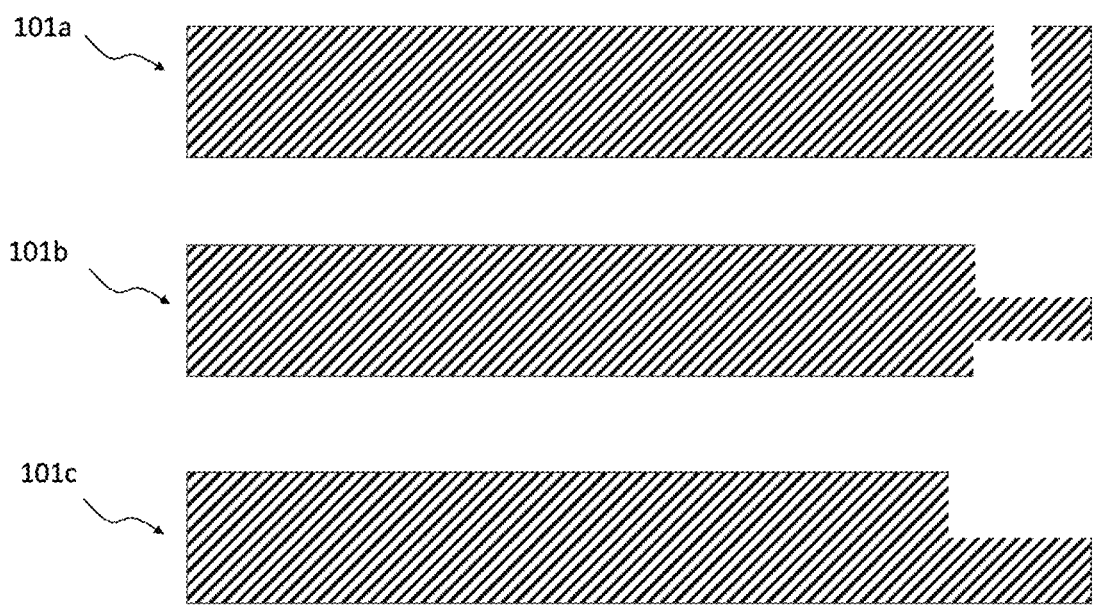

SURFACE TREATMENT OF A SULFIDE GLASS SOLID ELECTROLYTE LAYER

STATEMENT OF GOVERNMENT SUPPORT

This invention was made with Government support under Award No.: DE-AR0000772 awarded by the Advanced Research Projects Agency-Energy (ARPA-E), U.S. Department of Energy. The Government has certain rights in this invention.

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

1. Field

This disclosure relates to batteries, in particular batteries with a glass electrolyte separator based on lithium sulfide. Sulfide glass electrolyte sheets can be strengthened via removal of surface and edge flaws, such as by wet chemical etching. Lithium sulfide glass etching media and techniques are also described.

2. Description of Related Art

Theoretically, the strength of a solid electrolyte glass, in particular of a Li ion conducting sulfide glass sheet, is determined by the glass atomic bond strength. However, the practical strength of a solid electrolyte strongly depends on the presence of surface flaws and edge defects. Under realistic glass and battery processing conditions, cracks are oftentimes caused by the presence of edge defects, which may arise during trimming or cutting a web of ionically conductive glass when sizing the glass as a solid electrolyte separator in a battery cell. Mechanical polishing of solid electrolyte surfaces to remove defects and smooth surfaces is both time consuming and expensive and involves handling of particulate waste products. Accordingly, there is a need for improved methods of smoothing and removing edge defects and surface flaws that may be present in manufactured sheets of glassy sulfide electrolytes.

SUMMARY

The present disclosure provides a method for chemically treating ionically conductive sulfide glass solid electrolyte separators or separator layers. In particular, the treatment involves chemically etching a surface or surface region of the sulfide glass separator to blunt, lessen or remove edge defects or surface flaws, and/or to enhance surface smoothness. Compared to physical methods of removing scratches or smoothing surfaces, such as mechanical grinding and polishing, a chemical etching treatment, as described herein, is cost effective, reliable and well suited for high production environments.

In one aspect the present disclosure provides a method for chemically etching an ion conductive sulfide glass solid electrolyte article by contacting a surface of the glass electrolyte with etching media. In accordance with this aspect of the disclosure, in various embodiments the glass electrolyte may be in the form of a sheet or membrane, or more generally layer-like, and the chemical etching may be performed on one or both major opposing surfaces and/or peripheral edge surfaces. Theoretically, the strength of the sulfide glass sheet is determined by the glass atomic bond strength. However, practical strength often strongly depends on the lack of surface flaws and edge defects. The etching process described herein may be used to remove or polish defects such as scratches and edge protrusions and to enhance surface smoothness and improve surface uniformity and homogeneity, and thereby improve mechanical strength of the sulfide glass solid electrolyte sheets and membranes, facilitating high yield and improving battery performance.

In various embodiments, the chemically etched sulfide glass separator is a self-supporting or substrate-less sheet or web of ionically conductive sulfide glass (e.g., a glass sheet), and the etching treatment improves the structural strength of the glass electrolyte, which, in turn, enhances manufacturing yield and facilitates roll to roll processing.

In various embodiments the method involves applying or exposing a chemical etching media to a surface or surface region of a Li ion conducting sulfide glass solid electrolyte. In some embodiments the etching media is liquid phase (i.e., wet or liquid etching), and in other embodiments the etching media is a gas or vapor (i.e., dry or gaseous/vapor phase etching). It is also contemplated that the chemical etch process involves both wet and dry etching (e.g., simultaneously or sequentially).

Methods of application for wet etching include, but are not limited to, spraying, brushing, dripping, dip coating or spin coating the etching media onto the sulfide glass electrolyte or conveyance of the glass electrolyte through or into an etching bath or cartridge containing etching media. In a particular embodiment, etching is achieved by conveying the Li ion conductive sulfide glass sheet (e.g., in the form of a web) through an etching bath or etching cartridge, in line with continuous roll to roll processing and other processing steps. In various embodiments, prior to chemical etching, a masking material is applied or positioned to cover one or more portions of the glass sheet in order to protect those portions from exposure to the etching media.

In various embodiments, the active etchant species is water (i.e., water molecules). In various embodiments the chemical etching media is a liquid solution of water dissolved in a carrier solvent that is chemically inert in direct contact with the sulfide glass solid electrolyte. Sulfide glass solid electrolytes are highly sensitive to water, and conventional etching solutions would immediately attack and decompose the glass. It is therefore somewhat counter-intuitive that in accordance with various embodiments of the present disclosure, the etchant is water (i.e., water molecules), and the etching mechanism is hydrolysis. In accordance with the present disclosure, a key aspect to hydrolytic etching of a sulfide glass solid electrolyte is controlling the extent of etching and the etching rate. In various embodiments, this is achieved by formulating an etching solution that includes a low concentration of water molecules (as etchant) mixed with an inert carrier solvent (e.g., aprotic organic solvents such as glymes and acetonitrile). In other embodiments organic carbonic acids (e.g., formic acid, acetic acid, propionic acid, butyric acid, oxalic acid, and malonic acid) have been discovered to be effective etchants for sulfide glass solid electrolyte; for instance, when diluted in an appropriate inert carrier solvent.

In another aspect the present disclosure provides compositions that are usefully employed for chemically etching ionically conductive sulfide glass solid electrolytes. In various embodiments the etching solutions are prepared and dispensed into bottles or containers, and may be sold to battery or battery component manufacturers or processors as a sulfide glass solid electrolyte etching solution.

In yet other aspects the etching methods described herein may be utilized to structuralize the edges of a sulfide glass solid electrolyte separator sheet in order to facilitate edge seals, such as sealing the glass separator to an adjacent battery component or to a second glass separator.

BRIEF DESCRIPTION OF THE DRAWING

FIG. 1 illustrates sulfide glass sheet/membranes having various useful edge shapes in accordance with embodiments.

DETAILED DESCRIPTION

Reference will now be made in detail to specific embodiments. Examples of the specific embodiments are illustrated in the accompanying drawings. While the disclosure will be described in conjunction with these specific embodiments, it will be understood that it is not intended to limit the disclosure to such specific embodiments. On the contrary, it is intended to cover alternatives, modifications, and equivalents as may be included within the spirit and scope of the disclosure as defined by the appended claims. In the following description, numerous specific details are set forth in order to provide a thorough understanding of the present disclosure. Embodiments described in the present disclosure may be practiced without some or all of these specific details. In other instances, well known process operations have not been described in detail in order not to unnecessarily obscure the present disclosure.

When used in combination with "comprising," "a method comprising," "a device comprising" or similar language in this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this disclosure belongs.

In one aspect the present disclosure provides methods for chemically strengthening a Li ion conducting sulfide glass solid electrolyte. In various embodiments the sulfide glass solid electrolyte is in the form of a sheet as described in U.S. Pat. No. 10,164,289, hereby incorporated by reference for its disclosure relating to sulfide glass solid electrolyte structure, fabrication and composition. Non-limiting examples of sulfide glass solid electrolyte compositions that may be fabricated into a glass sheet separator include lithium phosphorous sulfide, lithium phosphorous oxysulfide, lithium boron sulfide, lithium boron oxysulfide, lithium boron phosphorous oxysulfide, lithium silicon sulfide, lithium silicon oxysulfide, lithium germanium sulfide, lithium germanium oxysulfide, lithium arsenic sulfide, lithium arsenic oxysulfide, lithium selenium sulfide, lithium selenium oxysulfide, lithium aluminum sulfide, lithium aluminum oxysulfide, and combinations thereof.

The present disclosure is not limited to any particular sulfide glass composition. However, it is particularly useful for sulfide glasses that are highly sensitive to water, and decompose in the presence of excess water. For this reason it is somewhat counter intuitive that in various embodiments the active etchant is water (i.e., water molecules). Indeed, conventional etching solutions which may be used to textualize or strengthen structural silicate glasses are aqueous acids that are chemically incompatible in contact with sulfide glass solid electrolytes and therefore entirely unsuitable for use herein as an etching media.

In accordance with the present disclosure, in various embodiments the chemical etching process is a hydrolytic etch that involves hydrolysis at the sulfide glass solid electrolyte surface, the etching media including water molecules as the active etchant (e.g., liquid phase or vapor phase). In the presence of water or its vapor, ionically conductive sulfide glasses generally undergo rapid hydrolysis followed by evolution of hydrogen gas. In various embodiments the hydrolysis rate may be reduced and controlled by mixing water with one or more non-aqueous solvents as the etching media. For instance, using non-aqueous solvents mixed with a low concentration of water as the chemical etchant. In various embodiments the concentration of water in the etching solution is between 0.01 to 2 Molar, and in particular embodiments, the etching solution is between 0.01 to 0.1 Molar or between 0.1 to 0.2 Molar or between 0.2 to 0.5 Molar. For example, such mixtures of water with acetonitrile or glymes, such as monoglyme (DME), may be used to decrease the rate of glass etching via hydrolysis. In other embodiments a gaseous mixture of water vapor and a carrier gas for which the glass sheet is inert may be used for controlling the etching rate. For example, the gaseous etching media may be a mixture of water vapor (as the active etchant) with nitrogen or argon as the carrier gas.

In various embodiments hydrolytic etching of the sulfide glass sheet produces a hydrolysis product, such as a salt, that is poorly soluble in water and the other non-aqueous solvents which are used in the etching media as an inert carrier. The presence of insoluble products can lead to the formation of a solid precipitate on the glass surface and a progressive reduction in the rate of surface etching. For instance, hydrolysis of $Li_2S-P_2S_5$ glasses leads to formation of lithium orthophosphate having low solubility in water. To mitigate solid precipitation taking place during the etching process, in various embodiments the etching media includes a solid product dissolving additive that is able to dissolve otherwise insoluble products resulting from the hydrolytic etch. In various embodiments the dissolving additive is an inorganic acid such as hydrochloric acid or sulfuric acid. In various embodiments the acid is dissolved in the carrier solvent. For instance, a nitrile such as acetonitrile is a particular suitable carrier solvent as it is inert in contact with the sulfide glass solid electrolyte and miscible with inorganic acids. For instance, concentrations of the dissolving additive may be in the range of 0.1 to 5 vol %. In a particular embodiment the etching media is a mixture of acetonitrile, water, and hydrochloric acid (e.g., having a hydrochloric acid concentration in the range of 0.1 to 5 vol % and a concentration of water in the range of 0.01 to 2 Molar). Because some inorganic acids are soluble in acetonitrile, it is contemplated to use low concentrations of hydrochloric or sulfuric acid in acetonitrile as the etching media. In various embodiments the process involves etching a surface or surface region of the sulfide glass solid electrolyte followed by rinsing the surface with an excess of acetonitrile, which does not react with sulfide glasses.

In various embodiments organic carbonic acids are used as the etchant, and, in particular, formic, acetic, propionic, butyric, oxalic, and malonic acids.

Liquid formic, acetic, propionic and butyric acids are miscible with aprotic solvents that are not reactive with sulfide glasses, and in particular glymes and organic carbonates. The solid carbonic acids such as oxalic and malonic acids have significant solubility in these solvents. In various embodiments, to control the rate of glass hydrolysis (or completely eliminate it), mixtures of formic, acetic, propionic and butyric acids with glymes, in particular dimethyl ether (DME), diglyme and triglyme may be used as carrier solvent, and/or organic carbonates, in particular, dimethyl carbonate (DMC).

The carbonic acid based etching media may be used in liquid phase. It is also contemplated to use a vapor of carbonic acids or their mixtures with carrier gases (e.g., nitrogen or argon). Regulation of the acid vapor pressure may be achieved by controlling the temperature and/or adjusting the ratio between the acid in the vapor phase and the carrier gas.

In various embodiments, the extent of etching may be controlled, in part, by modifying the composition of the etching media, as described above, as well as the duration of etching. Etching times may vary from seconds to minutes depending on the type of flaw or defect and more generally on the amount of material to be removed. In various embodiments these parameters are selected to remove an equivalent thickness of glass of about 0.1, 0.3, 0.5, 1.0, or about 5.0 microns, and in some embodiments, it is contemplated to remove more than 5 microns (e.g., between 5 to 10 microns) of glass.

In various embodiments the chemical etching process involves multiple etching steps. For instance, an initial controlled hydrolysis step using a water-based etchant followed by applying an acidic solution onto the etched surface to dissolve insoluble products formed during the hydrolytic etch, and especially those precipitates with low solubility in water. Once any surface precipitates or sludge has been removed by acid dissolution, a final rinsing may be applied to remove any residual products (water and acids) using aprotic solvent(s), such as glymes and organic carbonates.

In various embodiments a mask may be used to limit exposure of the etching media to only those areas intended for etching and material/defect removal. For instance, in various embodiments it is particularly important to etch the edges of the glass sheet or web in order to remove flaws that may result from trimming the edges during glass sheet manufacturing. In such embodiments the mask is positioned to cover the major opposing surfaces of the glass sheet while only exposing a narrow width along the sheet edge (e.g., the exposed width of about 10 um to 1 mm wide).

The material makeup of the mask depends, in part, on the composition of the etching media. In various embodiments the masks may be fabricated from metal and/or plastic layers.

For wet etching using a liquid solution of carbonic acid, as described, particularly useful masks may be made from chromium, titanium, aluminum, and nickel, for example. Titanium masks are particularly suitable for etching media based on acetic, formic, malonic, butyric and propionic acids. Nickel masks are particularly suitable for use with malonic, oxalic, and formic acids. And aluminum masks for use with propionic and butyric acid.

In various embodiments, a liquid mask may be employed. For instance mineral oil may be applied onto the surfaces of the sulfide glass solid electrolyte sheet or membrane and thereon serve as a masking overlayer. Methods for applying a mineral oil liquid mask include coating and printing techniques. In accordance with the present disclosure, in various embodiments the etching process may be incorporated as an inline station when fabricating a sulfide glass solid electrolyte sheet (e.g., using a drawdown process) and in particular for web and roll to roll manufacture. U.S. Pat. No. 10,164,289 describes manufacturing methods for making a web of sulfide glass solid electrolyte sheet (e.g., in line with drawing the sheet and trimming the edges to a certain width). In accordance with the present disclosure, wet etching processes, as disclosed herein, may be incorporated as an inline station for the web manufacture after the drawn down or otherwise processed sheet has been trimmed (e.g., mechanically sliced or laser cut).

In various embodiments the chemical etching processes described herein may be applied to the edge surfaces of a sulfide glass solid electrolyte sheet to modify the edge shape for scaling the glass electrolyte when incorporated in a battery cell. In particular shaping the edges may be used to optimize edge sealing of the glass separator to an adjacent electrode (e.g., cathode or anode) or some other component in the battery cell. In FIG. 1 sulfide glass sheet/membranes 101a/b/c having various useful edge shapes, for example for facilitating sealing to adjacent battery cell components, are illustrated in cross sectional depiction. This approach is particularly useful for edge sealing in battery cells that include a liquid electrolyte that should be prevented from contacting the electroactive material of one of the electrodes.

CONCLUSION

Although the foregoing has been described in some detail for purposes of clarity of understanding, it will be apparent that certain changes and modifications may be practiced within the scope of the appended claims. It should be noted that there are many alternative ways of implementing both the process and compositions of the present disclosure. Accordingly, the present embodiments are to be considered as illustrative and not restrictive, and the disclosure is not to be limited to the details given herein.

All references cited herein are incorporated by reference for all purposes.

What is claimed is:

1. A method for treating a surface of an ion conductive sulfide glass solid electrolyte, the method comprising exposing a surface or surface region of the sulfide glass solid electrolyte to an etching media, wherein water molecules are the etching media active etching species.

2. A method for treating a surface of an ion conductive sulfide glass solid electrolyte, the method comprising exposing a surface or surface region of the sulfide glass solid electrolyte to an etching media,
    wherein the etching media is a gaseous/vapor phase;
    wherein the etching media further comprises a nitrogen carrier gas that is inert in contact with the sulfide glass solid electrolyte.

3. A method for treating a surface of an ion conductive sulfide glass solid electrolyte, the method comprising exposing a surface or surface region of the sulfide glass solid electrolyte to an etching media,
    wherein the etching media is a gaseous/vapor phase; and
    wherein the gaseous/vapor phase comprises water vapor as an active etchant.

4. A method for treating a surface of an ion conductive sulfide glass solid electrolyte, the method comprising exposing a surface or surface region of the sulfide glass solid electrolyte to an etching media,
    wherein the etching media is a gaseous/vapor phase; and wherein the gaseous/vapor phase comprises acid vapor as an active etchant.

5. The method of claim 4 wherein pressure regulation of the vapor is achieved in part by controlling the temperature and/or the ratio between the acid in the vapor phase and the carrier gas.

6. The method of claim 4 wherein the acid vapor comprises carbonic acid vapor.

\* \* \* \* \*